Sept. 21, 1926.

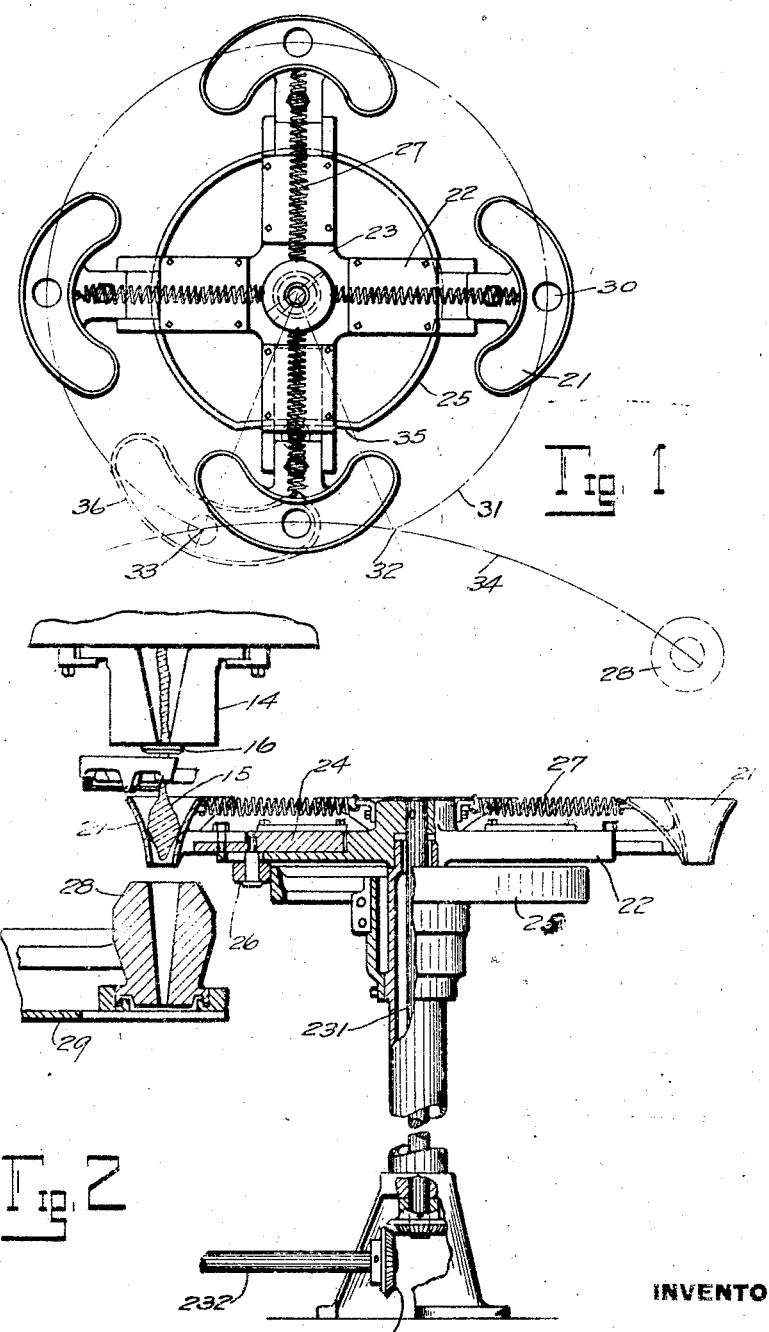

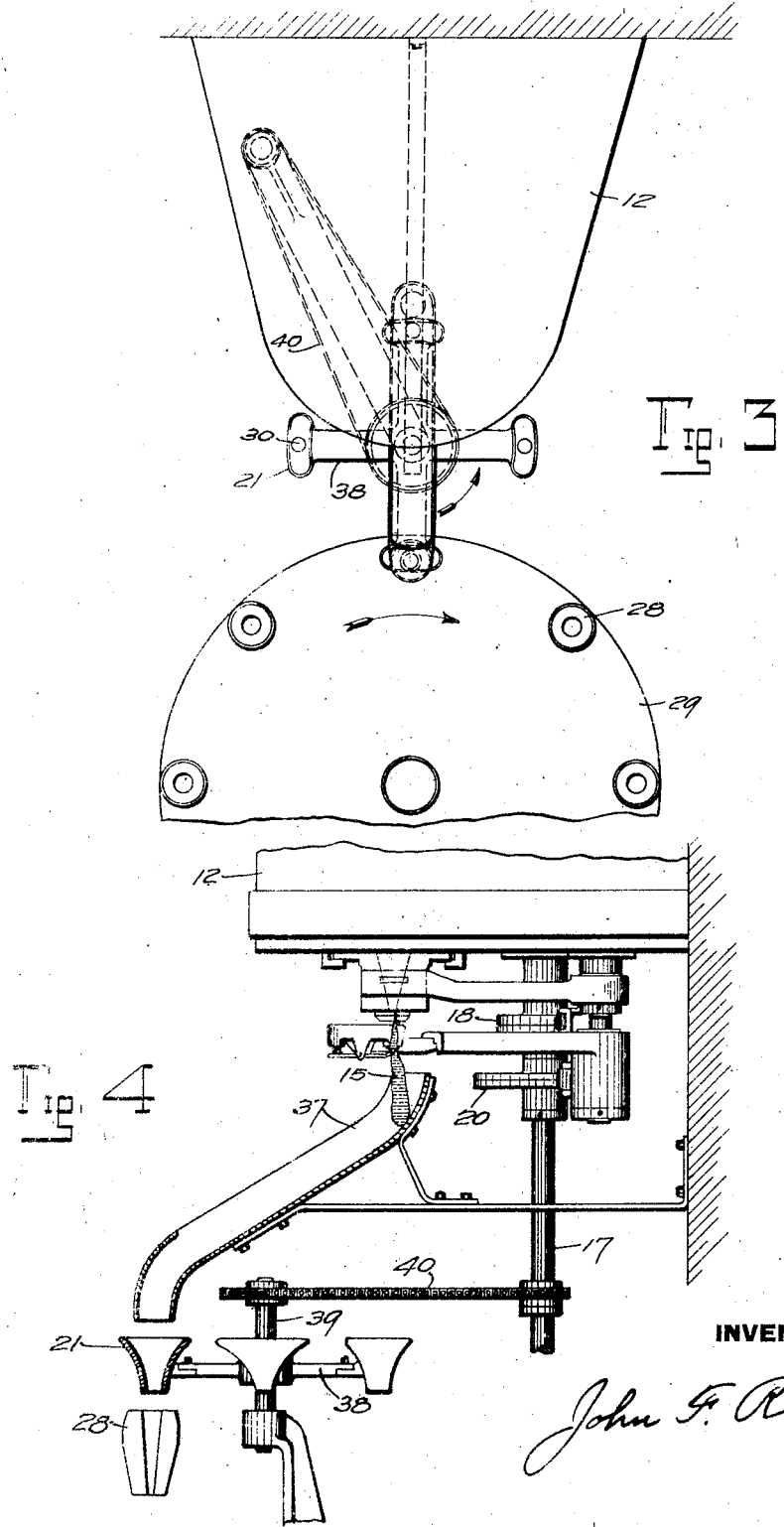

J. F. RULE 1,600,488

MEANS FOR TRANSFERRING AND GUIDING GLASS INTO MOLDS

Filed April 29, 1918  3 Sheets-Sheet 3

INVENTOR
John F. Rule

Patented Sept. 21, 1926.

1,600,488

UNITED STATES PATENT OFFICE.

JOHN F. RULE, OF TOLEDO, OHIO, ASSIGNOR TO THE OWENS BOTTLE COMPANY, OF TOLEDO, OHIO, A CORPORATION OF OHIO.

MEANS FOR TRANSFERRING AND GUIDING GLASS INTO MOLDS.

Application filed April 29, 1918. Serial No. 231,328.

My invention relates to means for directing charges of molten glass into molds or receptacles, and is particularly designed for use in charging the molds on a continuously rotating machine.

In the manufacture of bottles, tumblers and other glass articles which are formed in molds, it is customary to transfer the molten glass from the furnace to the molds either in the form of gobs or charges of the proper size for forming the articles, or to flow the glass in a stream into the molds. Sometimes a combination of these methods is employed. The molds are ordinarily mounted on a machine having a step by step rotation so that the molds are brought successively into position to receive a charge, and are held stationary while the charge is introduced.

A continuously rotating machine is much more rapid in operation than an intermittent machine, and possesses important mechanical advantages. With such a machine, however, the molds are in charging position only for an instant as they pass the charging point so that it is difficult or impossible to drop the glass into the mold, unless some special provision is made for guiding the glass.

An object of the present invention is to overcome this difficulty by providing practical means to guide the glass into the moving molds, such guiding means being operative through a considerable range of movement of the molds.

In its preferred form the invention comprises a series of guides moving continuously in a horizontal circular or closed path, each guide being in the form of a funnel with its upper end or mouth elongated in the direction of its movement. As each mold approaches the charging station, one of said funnels or guides is brought into position over the mold and in register therewith to direct the charge of glass into the mold.

Other features of the invention and the exact nature thereof will appear hereinafter.

Referring to the accompanying drawings, Figure 1 is a plan view of means for directing the glass to the molds.

Figure 2 is a part sectional elevation of the same.

Figure 3 is a plan view, partly diagrammatic, of a modified construction.

Figure 4 is a part sectional elevation of the same.

Figure 5:
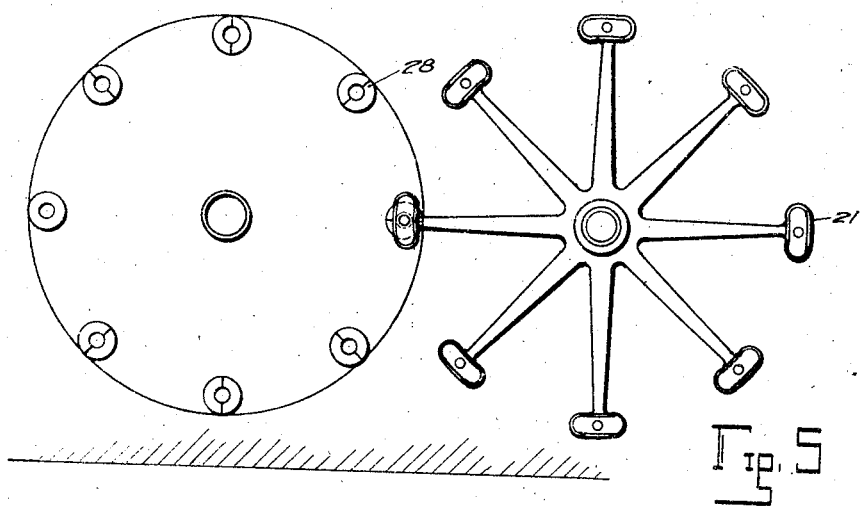
Figure 5 is a diagrammatic plan showing an arrangement in which the number of funnel guides is equal to the number of molds on the mold table.

The molten glass 10 (Fig. 7) may be supplied from a continuous melting tank 11 from which the glass flows into a boot or extension 12. The glass flows in a continuous stream through a flow opening 13 in the bottom of the boot into a sectional cup 14 in which it accumulates to form gobs or charges 15. A knife 16 forms a temporary bottom for the cup 14. When a portion of the charge has accumulated in the cup the knife is withdrawn, and later the cup sections separate, permitting the accumulated charge to drop. The cup sections then close and the knife operates to sever the discharged gob from the oncoming stream of glass and closes the bottom of the cup so that the glass again accumulates.

The mechanism for operating the divided cup and knife may be the same as disclosed in the co-pending application of Joseph B. Graham, Serial Number 174,697. This mechanism comprises a continuously rotating shaft 17 carrying a cam 18 which operates the cup sections. The knife 16 which is carried on an arm 19 is actuated by a cam 20, the latter being driven by the shaft 17, which makes one complete rotation for each charge of glass. The above mechanism shows one of the various methods which may be employed for supplying gobs or charges of glass to be introduced into the forming molds, but in itself forms no part of the present invention.

Referring to Figures 1 and 2 which illustrate one form of my invention, a series of guides or directing devices 21 are mounted on radial arms 22 of a continuously rotating spider or carrier 23. The guides or funnels 21 are carried on arms 24 mounted for radial movement on the spider arms 22. The radial position of the guides 21 is controlled by a stationary cam 25 on which run cam rolls 26 carried by the arms 24. Springs 27 hold the rolls 26 against the cam.

Forming molds 28 mounted on a continuously rotating mold table 29 are brought successively into charging position beneath the cup 14. The funnels 21 are arranged to pass between the cup and mold, being brought successively into register with the successive molds while the latter are passing the charging station, so that the gobs are guided into the mold. The funnel 21 is in register with the mold not only when the latter is directly beneath the cup 14, but owing to the movement of the funnels with the molds, the opening 30 in the bottom of the funnel remains directly over and in register with the mold opening for some time. The charge of glass is thus accurately directed into the mold, the arrangement permitting the discharge of the glass into the mold at any time while the funnel is beneath the accumulating cup 14 or the flow opening.

Referring to Figure 1, it will be seen that the discharge openings 30 of the funnels travel in an arc 31 except while in operative position beneath the flow opening. At the points 32 and 33 the arc 31 intersects the arc 34, the latter representing the path of travel of the molds. In order that the opening 30 shall follow the arc 34 between the points 32 and 33 and thus maintain the discharge opening 30 directly over the mold, the cam 25 is formed with a reentrant portion 35, shaped to accomplish this purpose. It will thus be seen that the center or discharge opening 30 of the funnel remains in register with the mold during the travel of the latter through a considerable distance, it being understood that the speed of the mold and funnel are equal. In order that the funnel may remain in operative relation to the cup 14 while it is in register with the mold, said funnel is elongated in the direction of its travel and also has its ends curved inwardly toward their center of rotation. The funnel 21 is shown in broken lines 36 (Fig. 1) at one limit of its operative position, the end of the funnel being beneath the flow opening, thus clearly indicating how the glass may be guided into the mold while the latter is a considerable distance beyond the gob forming cup 14.

It will be seen that the present invention provides means for accurately guiding the gobs of glass into the continuously moving molds even when the transfer of the gob to the mold takes place before or after the mold reaches a charging position directly beneath the forming cup. The invention further provides for directing the glass to the mold when there is more or less of a stream or flow of glass from the furnace to the mold. In practice, the knife is not always timed to sever the gob immediately upon its discharge from the gathering cup but may permit the flow to continue for a brief interval after the accumulated mass drops into the mold. This continued flow is in the nature of a tail or extension of the gob and is readily directed to the mold by the elongated guide 21. The funnel carrier 23 is keyed to a continuously rotating shaft 231 driven from a shaft 232 through bevel gears 233. The shaft 232 is driven in synchronism with the mold table so that the funnels are brought seriatim into register with the molds as above described.

Figures 3 and 4 illustrate a modified arrangement wherein the gobs of glass are carried down an inclined chute 37 and drop through the guides 21 into the molds 28. This arrangement permits the mold carrying machine to be placed farther from the furnace and in any desired position relative to the flow opening. The guides 21 are in this instance carried on a spider 38 mounted on a shaft 39 driven by a sprocket chain 40 geared to the cam shaft 17. The guides 21 are here shown as rigidly connected to the spider, no provision being made for radial movement of the guides. With this arrangement the funnels or guides remain in exact register with the molds a somewhat shorter length of time. They operate, however, with sufficient accuracy for practical purposes if the synchronizing of the gob discharging apparatus with the movement of the molds is reasonably close. Also, by making the discharge opening 30 of the funnel slightly smaller than the mold opening the funnel can guide the glass to the mold so long as the funnel is beneath the cup or flow opening. The path of the guides 21 is substantially tangent to that of the molds while cooperating with the latter.

Figure 5 indicates diagrammatically an arrangement in which the number of funnel guides 21 is equal to the number of molds 28. The relative number of molds and funnels may, of course, be varied as desired.

Figure 6:
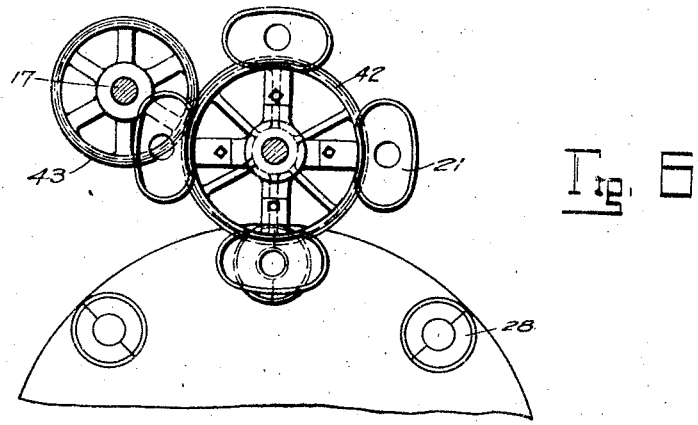
Figures 6 and 7 are views similar to Figures 3 and 4 respectively, showing a somewhat modified arrangement.
Figure 7:
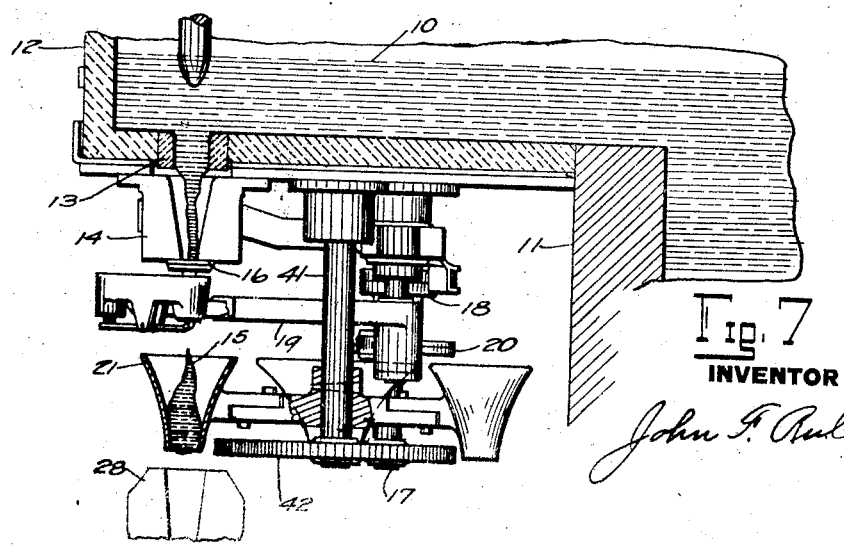

Figures 6 and 7 show an arrangement in which the funnels are disposed directly beneath the boot 12. A rotary shaft 41 is suspended from the boot and driven by a gear 42 meshing with a pinion 43 on the cam shaft 17. Although the invention is herein shown as used with a flowing device, supplying the glass to a single set of molds, it will be understood that it is equally adapted for use with mechanisms by which the charges of glass are directed alternately or successively to a number of machines or sets of molds from a single flowing device.

The terms guides, funnels, or equivalent terms as applied to the parts 21 in the specification and claims, are used to designate guiding means whose function and operation is to guide the charges of glass into the molds, the glass having only a momentary sliding contact therewith as it passes to the mold. The guides are thus clearly distinguished from transfer cups, molds or other receptacles which serve as containers to receive and hold the charges of glass for a greater or less interval of time, and in which the charges may be carried from one position to another.

Variations other than those herein indicated may be resorted to within the spirit and scope of my invention.

What I claim is:

1. The combination with a series of molds moving continuously in a closed path, of a series of guides revolving continuously about a stationary axis located outside of said closed path and brought successively into position to register with the successive molds, each guide remaining in register with its mold during an extended portion of its travel, and means to feed charges of molten glass to said guides at a feeding point past which each guide travels while in register with its mold, the guide being elongated in the direction of its travel to remain in register with the feeding point during its period of registry with the mold.

2. The combination with a glass forming machine comprising a series of molds revolving continuously in a closed path, of a series of funnels revolving continuously in a different closed path about a stationary axis and brought successively over and in register with the successive molds, said paths comprising parallel portions in which the molds and funnels travel while in register.

3. The combination of a series of molds moving continuously in a closed path, and a series of guides through which charges of glass are delivered by gravity into the molds, said guides revolving continuously about a stationary axis in a different closed path from that of the molds and brought successively into register with the molds, each guide moving at the same speed and in the same direction with its mold for a substantial distance while in register therewith.

4. Means for guiding charges of molten glass comprising a carrier rotating continuously about a stationary axis, guides mounted thereon for radial movement, a cam controlling said radial movement, said cam formed to cause the guides during a portion of their travel to move in the arc of a circle eccentric to the axis of rotation of said carrier, said guides formed to direct charges of glass dropped from a point above to a point below the guides without stopping or materially retarding the movement of the glass.

5. Means for guiding charges of molten glass comprising a continuously rotating carrier, guides mounted thereon for radial movement, a cam controlling said radial movement, said cam formed to cause the guides to move, during a portion of their rotation, in the arc of a circle whose center is external to the path of the guides, said guides formed to direct charges of glass dropped from a point above to a point below the guides without stopping or materially retarding the movement of the glass.

6. The combination with means for forming gobs of molten glass, of a continuously rotating mold table, molds thereon brought successively to charging position beneath the gob forming means, guides moving about a stationary axis in a circular path eccentric to and overlapping that of the molds, and means to impart to the guides while within range of the molds, a radial movement without interrupting their movement about said axis, to thereby cause the guides to register with the molds during an extended portion of their movement, said guides while in register with the molds being beneath said gob forming means in position to direct the gobs into the molds.

7. The combination with means for forming gobs of molten glass, of a continuously rotating mold table, molds thereon brought successively to charging position beneath the gob forming means, guides moving in a circular path eccentric to and overlapping that of the mold at a position beneath the gob forming means, and means to impart a radial movement to the guides while traversing said overlapping portion of their path, to thereby maintain the guides in register with the molds during an extended portion of their movement, the guides being inclined in their direction of travel so that they remain in register with the gob forming means while in register with the molds.

8. The combination with a charging station, of a mold carriage rotatable continuously about a vertical axis, an annular series of molds carried thereon and brought successively to the charging station, an annular series of funnel shaped guides, a carrier for the guides, means to rotate the carrier continuously about a stationary vertical axis in synchronism with the rotation of the mold carriage, said guides traveling in a plane above the molds and arranged to be brought serially above and into register with the respective molds as the latter pass the charging station, and means to cause each mold and its guide to travel in parallelism while passing the charging station, the guides being arranged to receive charges of glass from a point directly over said station and direct them into the molds.

9. The combination with a charging station, of a mold carriage rotatable continuously about a vertical axis, an annular series of molds carried thereon and brought successively to the charging station, an annular series of funnel shaped guides, a carrier for the guides, means to rotate the carrier about a vertical axis in synchronism with the rotation of the mold carriage, said guides traveling in a plane above the molds and arranged to be brought serially above and into register with the respective molds as the latter pass the charging station, the guides being mounted for radial movement, and means to control said radial movement and cause the guides to remain in register with the molds during an extended portion of their travel, the guides also being extended in their direction of travel to remain in charge receiving position while traveling in register with the molds.

10. The combination with a series of molds moving in a circular path, of a series of guides revolving continuously about a stationary axis and thereby brought successively into position to register with the successive molds, means to cause the guides to move radially of said axis while in register with the molds and thereby cause each guide to remain in register with its mold during an extended portion of its travel, and means to feed charges of molten glass to said guides at a feeding point past which each guide travels while in register with its mold, the guide being extended in the direction of its travel to remain in register with the feeding point during its period of registry with the mold.

Signed at Toledo, in the county of Lucas and State of Ohio, this 27th day of April, 1918.

JOHN F. RULE.